(12) United States Patent
Fukuda et al.

(10) Patent No.: US 9,371,869 B2
(45) Date of Patent: Jun. 21, 2016

(54) POWER TRANSMISSION APPARATUS

(75) Inventors: Hiromichi Fukuda, Tochigi (JP); Masaaki Fusegi, Tochigi (JP); Mitsuaki Kakuta, Tochigi (JP); Noriyuki Sudou, Tochigi (JP)

(73) Assignee: GKN Driveline Japan LTD., Tochigi (JP)

( * ) Notice: Subject to any disclaimer, the term of this patent is extended or adjusted under 35 U.S.C. 154(b) by 264 days.

(21) Appl. No.: 13/421,111

(22) Filed: Mar. 15, 2012

(65) Prior Publication Data

US 2012/0234120 A1 Sep. 20, 2012

(30) Foreign Application Priority Data

Mar. 15, 2011 (JP) .................. 2011-057042
Apr. 8, 2011 (JP) .................. 2011-086195

(51) Int. Cl.
| | |
|---|---|
| *B60K 17/02* | (2006.01) |
| *F16D 27/118* | (2006.01) |
| *B60K 17/344* | (2006.01) |
| *B60K 17/16* | (2006.01) |
| *B60K 23/08* | (2006.01) |

(52) U.S. Cl.
CPC ............. *F16D 27/118* (2013.01); *B60K 17/02* (2013.01); *B60K 17/165* (2013.01); *B60K 17/344* (2013.01); *B60K 23/08* (2013.01); *B60K 2023/0858* (2013.01); *Y02T 10/76* (2013.01); *Y10T 74/19614* (2015.01)

(58) Field of Classification Search
CPC ....................................... B60K 17/02
USPC ................... 74/405, 417, 424; 475/149, 150; 192/84.1; 180/244, 248
See application file for complete search history.

(56) References Cited

U.S. PATENT DOCUMENTS

| | | | |
|---|---|---|---|
| 6,688,444 B2* | 2/2004 | Terada | ......................... 192/48.2 |
| 6,945,895 B2* | 9/2005 | Fusegi et al. | .................. 475/150 |
| 7,325,664 B2* | 2/2008 | Fusegi | ........................ 192/84.92 |
| 2003/0178277 A1 | 9/2003 | Terada | |
| 2008/0230295 A1 | 9/2008 | Grogg | |
| 2009/0229905 A1 | 9/2009 | Kato et al. | |
| 2010/0062891 A1* | 3/2010 | Ekonen et al. | ................ 475/223 |

FOREIGN PATENT DOCUMENTS

| | | |
|---|---|---|
| JP | 62-059130 A | 3/1987 |
| JP | H04-372427 A | 12/1992 |
| JP | 2003-278804 A | 10/2003 |
| JP | 2004-208460 A | 7/2004 |

OTHER PUBLICATIONS

Abstract of JP62-059130(A), dated Mar. 14, 1987, downloaded from the Espacenet Worldwide Database, 1 page.
Notification of Reasons for Refusal issued in corresponding Japanese Application No. 2011-057042, mailed on Oct. 20, 2014 (9 pages).

* cited by examiner

*Primary Examiner* — William C Joyce
(74) *Attorney, Agent, or Firm* — Osha Liang LLP

(57) ABSTRACT

A power transmission apparatus is provided with a first rotational member, a second rotational member, a clutch device for coupling a power transmission between the first rotational member and the second rotational member, and a ring shape actuator of the clutch device. A rotational axis of one of the first rotational member and the second rotational member penetrates through a radially internal space of the ring shape actuator.

6 Claims, 6 Drawing Sheets

POWER TRANSMISSION APPARATUS

BACKGROUND OF THE INVENTION

1. Field of the Invention

The present invention relates to a power transmission apparatus.

2. Related Art

US2008/0230295 discloses a conventional power transmission apparatus. This power transmission apparatus includes a clutch housing which is concentrically provided on an outer periphery of a hollow input shaft and on which a ring gear and an interrupting clutch are supported. Both ends of the clutch housing are rotatably supported on a case via bearings. The clutch can be operated by a hydraulic piston provided on the case.

The ring gear is in mesh with a pinion gear which is formed on an output shaft of rear wheel side.

Accordingly, if the clutch is operated by driving the hydraulic piston, the clutch housing is connected to the hollow shaft and an input power from the hollow shaft is rotationally transmitted to the pinion gear via the clutch, the clutch housing and the ring gear. Consequently, a power can be outputted from the output shaft to the rear wheels.

However, since the ring gear and the clutch are arranged adjacent to each other between the bearings and supported on the clutch housing in this configuration, the ring gear adjacent to the clutch is subjected to a constraint by the clutch. Accordingly, there is a problem that a limit in reducing a diameter of the ring gear is caused and thus the degree of design freedom is inhibited.

US2009/0229905 discloses another conventional power transmission apparatus. This power transmission apparatus includes an input shaft into which a driving force is inputted, a bevel gear as an input gear which is rotationally driven by the driving force inputted, an output pinion as an output gear which is in mesh with the bevel gear and an output shaft which is provided to rotate integrally with the output pinion.

In this power transmission apparatus, a clutch plate as a clutch device is provided between a clutch hub and a clutch drum which are respectively provided on the input shaft and the bevel gear to rotate integrally therewith and a cam mechanism actuated by a servo motor as an actuator which is operated to interrupt the clutch plate is disposed on the input shaft.

However, in this power transmission apparatus, since the actuator such as the servo motor for interrupting the clutch device or the cam mechanism is arranged around the input shaft, there is a risk of interference with surrounding members such as an engine arranged around the power transmission apparatus. Accordingly, it is difficult to change the design of the actuator in order to improve the interruption property of the clutch device.

On the contrary, JP-A-62-059130 discloses further another power transmission apparatus. This power transmission apparatus includes an input shaft into which a driving force is inputted, a power distributing drive gear as an input gear which is provided to rotate integrally with the input shaft, a power distributing driven gear as an intermediate gear which is in mesh with the power distributing drive gear, an intermediate shaft which is provided to rotate integrally with the power distributing driven gear, an auxiliary shaft which is disposed to rotate relative to the intermediate shaft, a turning drive gear as an intermediate output gear which is provided to rotate integrally with the auxiliary shaft, a turning driven gear which is in mesh with the turning drive gear and an output shaft which is provided to rotate integrally with the turning driven gear.

In this power transmission apparatus, the clutch gears as the clutch device are respectively provided on the intermediate shaft and the auxiliary shaft and a dog clutch as a clutch member is connected to the clutch gear of the intermediate shaft to move in an axial direction and rotate integrally therewith. As the dog clutch is moved in an axial direction, the dog clutch is connected to the clutch gear of the auxiliary shaft. Further, the intermediate shaft and the auxiliary shaft are connected to each other to rotate integrally. In this way, a power transmission between the intermediate shaft and the auxiliary shaft is allowed. This clutch member is moved in an axial direction by an actuator such as a shift fork provided around the intermediate shaft to interrupt the clutch device.

However, in the power transmission apparatus as disclosed in JP-A-62-059130, since the clutch device is provided between the intermediate shaft and the auxiliary shaft and the clutch member is provided in the intermediate shaft to move axially, it is necessary to secure a moving stroke of the clutch member in the intermediate shaft and thus the size of the power transmission apparatus becomes larger.

Further, since the input shaft and the input gear are provided to rotate integrally, the intermediate gear in mesh with the input gear is provided on the intermediate shaft to rotate integrally therewith and the clutch device is provided between the auxiliary shaft and the intermediate shaft, a driving force inputted from the input shaft side causes the intermediate shaft to be normally rotated even in a disconnected state of the clutch device. Accordingly, the fuel consumption is lowered.

SUMMARY OF THE INVENTION

One or more embodiments provide a power transmission apparatus in which a diameter of a gear adjacent to the clutch can be reduced and a degree of design freedom is improved.

Moreover, one or more embodiments provide a power transmission apparatus capable of being made in a compact size while improving a fuel consumption.

DETAILED DESCRIPTION OF THE EMBODIMENTS

Hereinafter, embodiments of the invention and modifications thereof will be described with reference to the drawings. The embodiments and the modifications described herein are not intended to limit the invention but only to exemplify the invention, and all features or combinations of the features of the embodiments and/or modifications are not always essential to the invention.

[Embodiment 1]

Figure 1:
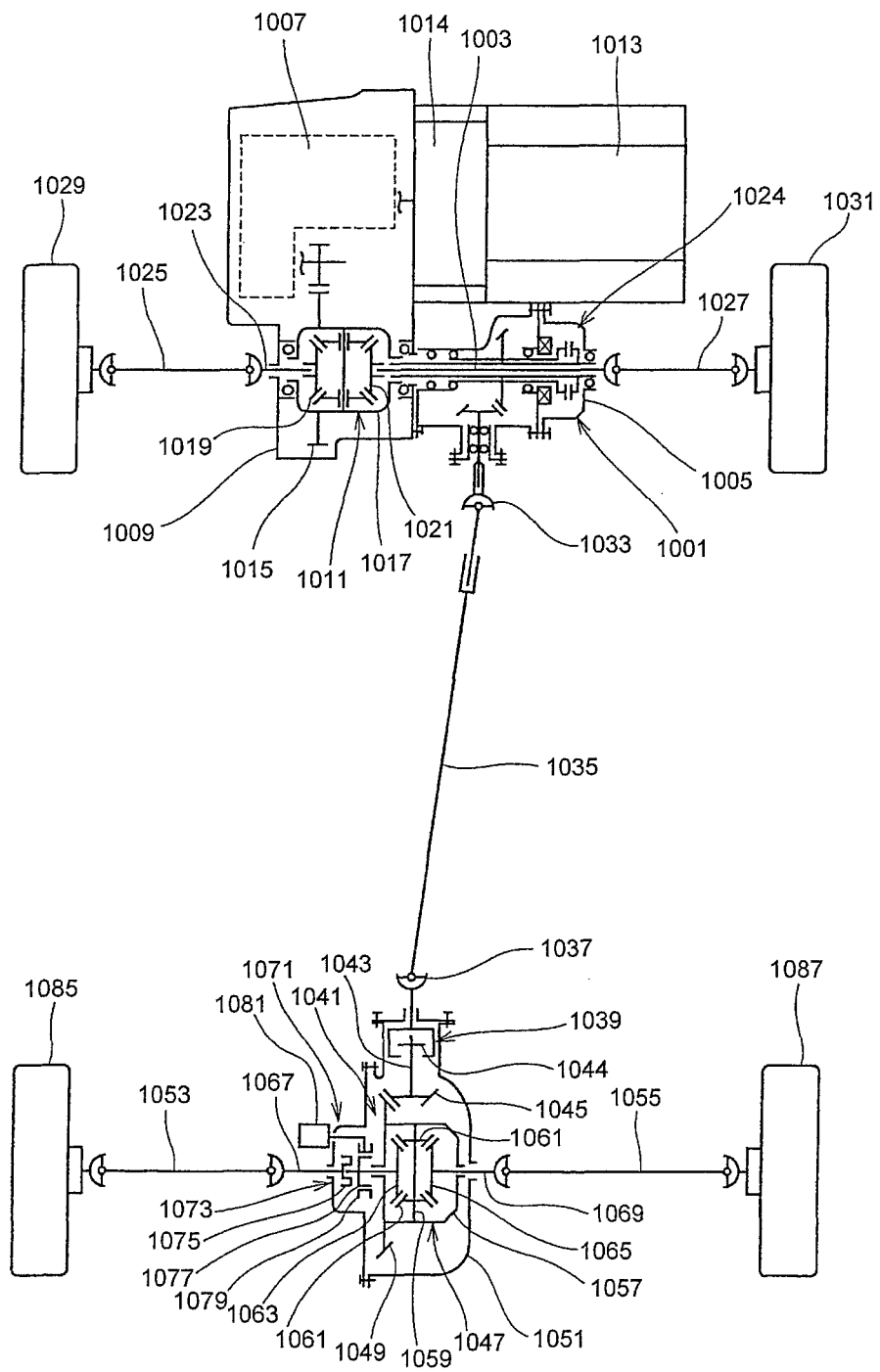
FIG. 1 is a skeleton plan view of a four-wheeled drive vehicle. (Embodiment 1)

FIG. 1 is a skeleton plan view of a four-wheeled drive vehicle.

As illustrated in FIG. 1, a transfer apparatus 1001 as a power transmission apparatus according to Embodiment 1 is placed on an outer periphery of a front intermediate shaft 1003 in one side of front wheels. A transfer case 1005 as a case of the transfer apparatus 1001 is attached to a bell housing 1009 as a case of a transmission 1007.

A front differential device 1011 is supported within the bell housing 1009. The front differential device 1011 is subjected to a driving input via an engine 1013 or an electric motor 1014 as a driving source and the transmission 1007. The driving input is transmitted to a front differential case 1017 via a ring gear 1015.

Front intermediate shafts 1023, 1003 are respectively coupled to left and right side gears 1019, 1021 as an output part of the front differential device 1011. Each of the front intermediate shafts 1023, 1003 is coupled to left and right front wheel axles 1025, 1027 to connect the front differential device 1011 and the front wheel axles 1025, 1027. Accordingly, the front differential device 1011 is interposed between the front wheel axles 1025, 1027.

The transfer apparatus 1001 includes a first clutch 1024 (will be described later) and selectively distributes and outputs the driving input of the front differential device 1011 to the rear wheel side. The front intermediate shaft 1003 is arranged to pass through the transfer case 1005 of the transfer apparatus 1001. The front wheel axles 1025, 1027 are respectively in interlocking connection with left and right front wheels 1029, 1031.

A propeller shaft 1035 is coupled to an output side of the transfer apparatus 1001 via a universal joint 1033. A drive pinion shaft 1043 of a final reduction device 1041 is coupled to the propeller shaft 1035 via a universal joint 1037 and a power transmission coupling 1039 for drive control. The power transmission coupling 1039 includes a third clutch 1044 for drive control.

The drive pinion shaft 1043 includes a drive pinion gear 1045 which is in mesh with a ring gear 1049 of a rear differential device 1047.

The rear differential device 1047 is rotatably supported on a carrier case 1051.

The rear differential device 1047 is provided between the rear wheel axles 1053, 1055 and includes a rear differential case 1057 to which the ring gear 1049 is attached. A pinion gear 1061 is rotatably supported on the rear differential case 1057 via a pinion shaft 1059. Further, the left and right side gears 1063, 1065 which are in mesh with the pinion gear 1061 are rotatably supported on the rear differential case 1057.

A pair of left and right rear intermediate shafts 1067, 1069 as an output shaft is coupled to the left and right side gears 1063, 1065. The rear intermediate shaft 1067 is provided with an axle disconnect device 1071 to carry out a power interruption control.

The axle disconnect device 1071 includes a second clutch 1073 configured as a shift sleeve mechanism. The second clutch 1073 includes a shift sleeve 1079 in mesh with a pair of gears 1075, 1077 and is configured to control an axial movement of the shift sleeve 1079 by a motor actuator 1081.

When the shift sleeve 1079 is in mesh with the pair of gears 1075, 1077, it is possible to transmit a power toward the rear intermediate shafts 1067, 1069. On the contrary, when the shift sleeve 1079 moves and is disengaged from the gear 1075, it is impossible to transmit a power toward the rear intermediate shafts 1067, 1069.

The rear wheel axles 1053, 1055 are coupled to the rear intermediate shaft 1067, 1069 and left and right rear wheels 1085, 1087 are in interlocking connection with the rear wheel axles 1053, 1055.

Accordingly, when the first and second clutches 1024, 1073 are in an off-state and the third clutch 1044 is in an uncontrolled state, 2WD is performed. In this state, when a power is inputted into the ring gear 1015 of the front differential device 1011 via the engine 1013 or the electric motor 1014 and the transmission 1007, the power is transmitted only to the left and right front wheels 1029, 1031 via the front intermediate shafts 1023, 1003 and the front wheel axles 1025, 1027. Accordingly, a drive system path from an outer sleeve 1089 (will be described later) to the rear differential case 1057 is maintained in a non-rotation state and thus fuel consumption in 2WD state is improved.

When the first and second clutches 1024, 1073 are in an on-state and the third clutch 1044 is in a controlled state, 4WD is performed. In this state, on the one hand, a power is transmitted to the left and right front wheels 1029, 1031 as mentioned above and on the other hand, a power is transmitted to the rear wheels via the front differential case 1017 and the transfer apparatus 1001.

As a power is outputted toward the rear wheels, the power is transmitted to the ring gear 1049 of the rear differential device 1047 via the universal joint 1033, the propeller shaft 1035, the universal joint 1037, the third clutch 1044, the drive pinion shaft 1043 and the drive pinion gear 1045. From the rear intermediate shafts 1069, 1071 of the rear differential device 1047, a power is transmitted to the left and right rear wheels 1085, 1087 via the left and right rear wheel axles 1053, 1055.

Accordingly, it is possible to switch a state of a vehicle between 2WD and 4WD by controlling on-state and off-state of the first and second clutches 1024, 1073 and the control state of the third clutch 1044.

Figure 2:
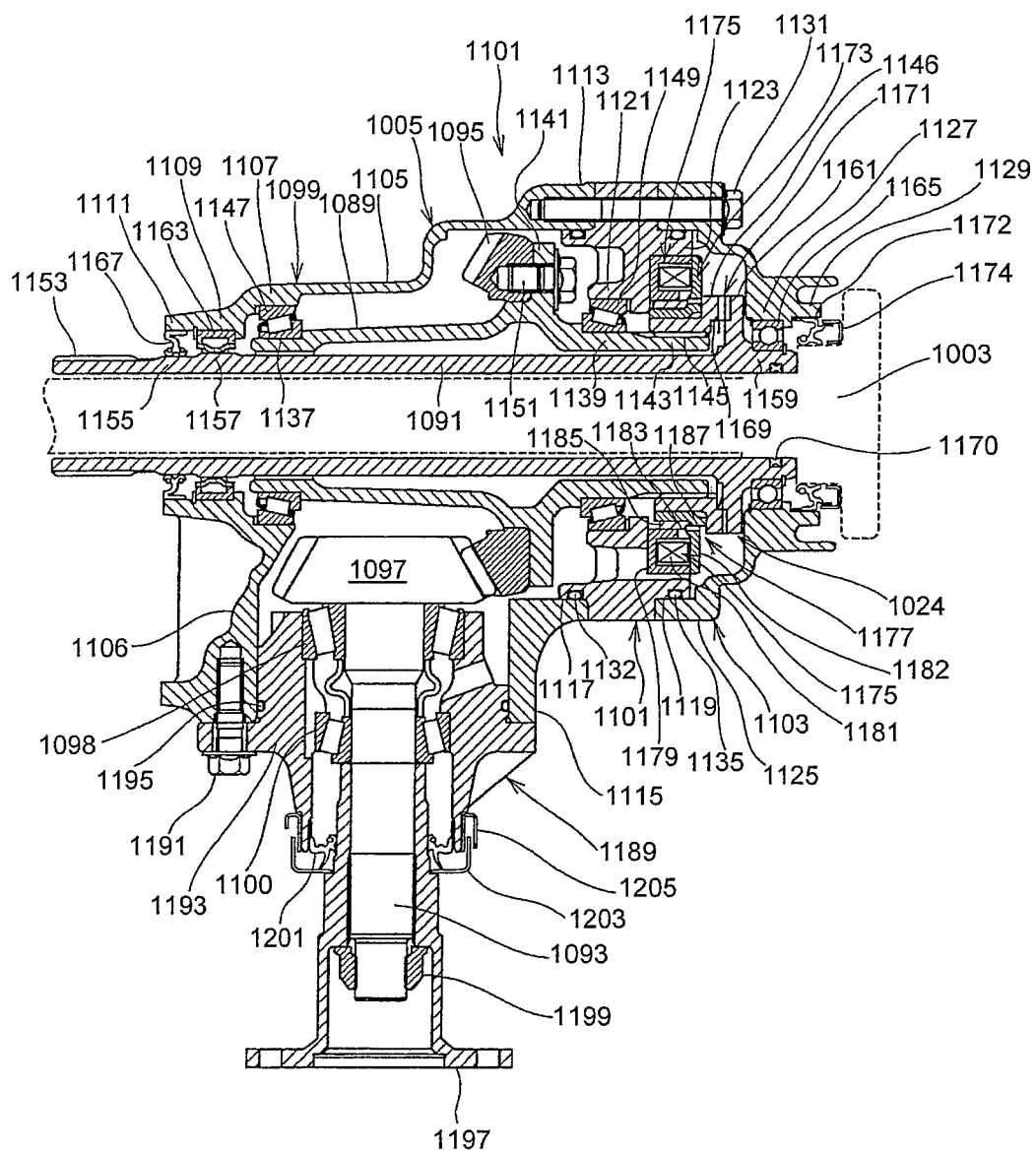
FIG. 2 is a cross-sectional view of a transfer apparatus. (Embodiment 1)

FIG. 2 is a cross-sectional view of the transfer apparatus 1001.

As illustrated in FIG. 2, the transfer apparatus 1001 includes an outer sleeve 1089 and inner sleeve 1091 as a transverse shaft, a rear wheel output shaft 1093 as an orthogonal shaft, a ring gear 1095 as a first gear, a second pinion gear 1097 as a second gear and the first clutch 1024. The outer sleeve 1089 and the inner sleeve 1091 are rotatably supported on the transfer case 1005 and arranged orthogonal to each other. The ring gear is provided on the transverse shaft and the pinion gear 1097 is in mesh with the ring gear 1095 and provided on the rear wheel output shaft 1093.

The transfer case 1005 includes a main body 1099, an intermediate wall 1101 and a cover 1103.

The main body 1099 includes a first part 1105 for supporting the transverse shaft and a second part 1106 for supporting the orthogonal shaft.

The first part 1105 includes one end on which bearing support parts 1107, 1109 and a seal support part 1111 are formed and the other end on which a first attaching hole 1113 of the intermediate wall 1101 is formed. The second part 1016 is formed with a second attaching hole 1115 for supporting the rear wheel output shaft 1093.

The intermediate wall 1101 is provided at both sides of an outer periphery thereof with fitting parts 1117, 1119 and at an inner periphery thereof with a bearing support part 1121 and an actuator support part 1123.

The cover 1103 includes an aligning port 1125 at one end thereof and a bearing support part 1127 and a seal support part 1129 at an inner periphery of the other end thereof.

In the intermediate wall 1101, the fitting part 1117 is fitted into the first attaching hole 1113 and the aligning port 1125 of the cover 1103 is fitted into the fitting part 1119. The main body 1099, the intermediate wall 1101 and the cover 1103 are fastened together by a bolt 1131. An O-ring 1133 supported on the fitting part 1117 is arranged close to the inner periphery of the first attaching hole 1113 and the o-ring 1135 supported on the fitting part 1119 is arranged close to the aligning port 1125 of the cover 1103.

Accordingly, the transfer case 1005 as the case includes a detachable intermediate wall 1101 which supports one of the bearings (will be described later) and the actuator.

The outer sleeve 1089 includes a bearing support part 1137 at one end thereof and a bearing support part 1139 at the other end thereof. A support flange 1141 for supporting the ring gear 1095 is provided between the bearing support parts 1137, 1139. The other end of the outer sleeve 1089 extends further outward from the bearing support part 1139 and includes a support part 1143 protruding from the bearing support part 1139 toward the intermediate wall 1101. The support part 1143 is formed with a spline 1145. A moveable body 1146 for interruption is spline-fitted into the support part 1143 to move in an axial direction.

In the outer sleeve 1089, the bearing support parts 1137, 1139 are supported on the bearing support parts 1107, 1121 via bearings 1147, 1149 and the ring gear 1095 is fastened to the support flange 1141 by the bolt 1151.

Accordingly, the outer sleeve 1089 is supported on the transfer case 1005 as a case by the bearings 1147, 1149 in both sides of the ring gear 1095 as a first gear. One end of the outer sleeve 1089 extends outwards between the bearings 1147, 1149 to provide the support part 1143.

The inner sleeve 1091 is concentrically disposed within the outer sleeve 1089 and configured to receive an input from the front differential case 1017. The inner sleeve 1091 is formed at one end thereof with a spline 1153. The spline 1153 is spline-fitted into the front differential case (see, FIG. 1) to receive the input.

A seal support part 1155 and a bearing support part 1157 are sequentially formed adjacent to the spline 1153. The inner sleeve 1091 is formed at the other end thereof with a bearing support 1159 and an opposed part 1161 adjacent to the bearing support part 1159.

In the inner sleeve 1091, the bearing support parts 1157, 1159 are supported on the bearing support parts 1109, 1127 via bearings 1163, 1165 and a seal supported on the seal support part 1111 is arranged close to the seal support part 1155. The opposed part 1161 is arranged to oppose to the moveable body 1146. And, a return spring 1169 for returning the moveable body 1146 is provided between the opposed part 1161 and the moveable body 1146.

Further, X-ring 1170 as a seal is attached to an end of the inner sleeve 1091 and a seal 1172 is attached to the seal support part 1129 of the cover 1103. The X-ring 1170 and the seal 1172 are respectively arranged close to an outer peripheral surface of the front intermediate shaft 1003. A dust cover 1174 is attached to the front intermediate shaft 1003 and arranged close to a lip of the seal 1172.

A dog clutch 1171 of the first clutch 1024 is provided between the moveable body 1146 and the opposed part 1161 and serves as a clutch device to interrupt coupling therebetween by the movement of the moveable body 1146. The dog clutch 1171 is constituted by dog teeth which are respectively formed on the opposed surface of the moveable body 1146 and the opposed part 1161.

A solenoid actuator 1173 as an actuator for interrupting and moving the moveable body 1146 is supported on the actuator support part 1123 of the intermediate wall 1101. The solenoid actuator 1173 has a ring shape and disposed such that the solenoid actuator 1173 surrounds the outer sleeve 89. That is, the inner sleeve 91 and the outer sleeve 89 as well as a common rotational axis of the inner sleeve 91 and the outer sleeve 89 penetrate through a radially inner space of the ring shape actuator 1173.

The solenoid actuator 1173 includes a solenoid 1175 and a plunger 1177 and drives the moveable body 1146 in an axial direction.

The solenoid 1175 is fixed to the actuator support part 1123 and connected to a controller side via a harness. The solenoid 1175 is configured to generate an electromagnetic force in accordance with an electric current control and includes a yoke 1179 and a coil 1181.

The yoke 1179 is a fixed core which is formed in an annular shape around a rotational axis of the outer sleeve 1089 by a magnetic body and arranged concentric with the outer sleeve 1089. A suction wall 1182 is integrally coupled to the yoke 1179 to constitute the fixed core. The suction wall 1182 is formed with a suction part 1183 made of a magnetic material.

The plunger 1177 is formed in an annular shape and arranged in an inner periphery side of the yoke 1179. The plunger 1177 is a moveable core which is supported on the moveable body 1146 to move in an axial direction. The plunger 1177 includes a magnetic force acting part 1185 made of a magnetic material and an interlocking part 1187 made of a non-magnetic material. The interlocking part 1187 may be integrally coupled to the magnetic force acting part 1185 by welding or press-fitting or may be integrally formed with the magnetic force acting part 1185. The interlocking part 1187 is slidably fitted into an outer periphery of the moveable body 1146 and can move together with the moveable body 1146. A smoothly inclined taper part opposing to the suction part 1183 is formed on an outer peripheral end of the magnetic force acting part 1185.

The rear wheel output shaft 1093 is rotatably supported on a cylindrical part 1189. The cylindrical part 1189 is fitted into an inner cylindrical part of the second attaching hole 1115 in the second part 1106 of the main body 1099 and fixed thereto by a bolt 1191. A pair of taper roller bearings 1098, 1100 is provided on an inner peripheral surface of the cylindrical part 1189 to support is the rear wheel output shaft 1093.

An O-ring 1195 is supported on a cylinder portion 1193 of the cylindrical part 1189 and arranged close to an inner periphery of the second attaching hole 1115.

A flange member 1197 is attached to an end of the rear wheel output shaft 1093. As a nut 1199 is fastened on the rear wheel output shaft 1093, it is possible to prevent the flange member 1197 from being separated and to assign a preload to the bearings 1098, 1100. The flange member 1197 is coupled on the side of the universal joint 1033.

A seal member 1201 is provided between the flange member 1197 and the bearing case 1193. Dust covers 1203, 1205 are provided on an axial outer side and an outer periphery side of the seal member 1201.

Accordingly, when the solenoid 1175 is energized, magnetic flux is generated on the yoke 1179, the suction wall 1182 and the magnetic force acting part 1185 of the plunger 1177.

By such a formation of the magnetic flux, the magnetic force acting part 1185 is suctioned by the suction part 1183 and the plunger 1177 moves axially.

By such a movement of the plunger 1177, the interlocking part 1187 is caused to forcibly move the moveable body 1146. By forcibly moving the moveable body, the moveably body 1146 is moved against an urging force of the return spring 1169.

Although the cylindrical part 1189 is formed as a separate body from the main body 1099 and fixedly connected to the main body 1099 by the bolt 1191, the cylindrical part 1189 can be integrally formed with the main body 1189. Further, a unit bearing constituted by integrally coupling an outer race of the bearings 1098, 1100 and the cylindrical part 1189 may be used.

By such a movement of the moveable body 1146, the dog clutch 1171 is in an engaged state and the outer sleeve 1089 and the inner sleeve 1091 are coupled to rotate integrally. By such a coupling, a power inputted from the front differential case 1017 to the inner sleeve 1091 is transmitted to the outer sleeve 1089, the ring gear 1095, the pinion gear 1097 and the rear wheel output shaft 1093.

As a power is transmitted in such a way, the power directing toward the rear wheels is distributed by the transfer apparatus 1001, as mentioned above. Accordingly, 4WD travel becomes possible.

When the energization of the solenoid 1175 is released, the suction part 1183 stops suctioning the magnetic force acting part 1185 and the moveable body 1146 is urged to its original position by an urging force of the return spring 1169. Accordingly, the dog clutch 1171 is disengaged.

As the dog clutch is disengaged, the outer sleeve 1089 is separated from the inner sleeve 1091 and thus a power transmission from the inner sleeve 1091 to the outer sleeve 1089 is not performed. Accordingly, 2WD travel becomes possible, as mentioned above.

[Effect of Embodiment 1]

The power transmission apparatus according to Embodiment 1 is realized as the transfer apparatus 1001 which includes the transverse and orthogonal shafts 1089, 1091, 1093 rotatably supported on the transfer case 1005 and arranged orthogonal to each other, the ring gear 1095 provided on the transverse shaft 1089 and the pinion gear 1097 in mesh with the ring gear 1095 and provided on the rear wheel output shaft 1093 as the orthogonal shaft. The transverse shaft includes the outer sleeve 1089 for supporting the ring gear 1095 and the inner sleeve 91 concentrically disposed within the outer sleeve 1089 and receiving an input power from the differential case 1017 of the front differential device 1011.

The outer sleeve 1089 is supported on the transfer case 1005 by bearings 1147, 1149 in both sides of the ring gear 1095 and one end of the outer sleeve 1089 extends outward between the bearings 1147, 1149 to provide the support part 1143. Further, the movable body 1146 for interruption is supported on the support part 1143 and the inner sleeve 1091 is provided with the opposed part 1161 which is opposed to the movable body 1146. And, the dog clutch 1171 is provided between the movable body 1146 and the opposed part 1161 and interrupts coupling therebetween by the movement of the moveable body 1146. Further, the solenoid actuator 1173 for interrupting and moving the moveable body 1146 is provided on the transfer case 1005.

By these configurations, it is possible to release the ring gear 1095 from a constraint by the first clutch 1024 for interruption and to select the size of the diameter of the ring gear 1095, regardless of the first clutch 1024. Accordingly, it is possible to increase the degree of design freedom.

Further, the bearings 1147, 1149 may support the outer sleeve 1089 on both sides of the ring gear 1095 and thus it is possible to reduce the span of the bearings.

In case of a standardized product without a clutch device and an actuator, it is sufficient to eliminate the intermediate wall 1101, to employ a cover having a bearing support part for supporting the bearing 1149, instead of the cover 1103 and to directly fix the cover to the first attaching hole 1113.

Thereby, it is possible to increase compatibility with the standardized product.

[A—Modifications of Embodiment 1]

The clutch device may be a part capable of interrupting the coupling between the outer sleeve 1089 and the inner sleeve 1091 and is not limited to the dog clutch 1171. For example, the clutch device may be applied to a sleeve dog clutch, a frictional clutch and a combination of the frictional clutch and the dog clutch.

An actuator capable of interrupting the clutch device may be used as the actuator and the actuator is not limited to the solenoid actuator 1173. For example, various actuators such as a hydraulic actuator, a pneumatic actuator, an actuator having electric motor/cam mechanisms may be applied as the actuator.

The power transmission apparatus may be arranged on a rear side of a 4WD vehicle which adopts FR, MR or RR type while employing a 2WD rear drive as a base mode.

Although the axle disconnect device 1071 is described as an example of the second clutch 1073, a free running differential device or a hub clutch device may be applied as long as it can interrupt a power transmission from the propeller shaft 1035 toward the rear wheels 1085, 1087. And, a dog clutch or a frictional clutch may be used as the clutch mechanism. Further, if a clutch capable of controlling the power transmission is used as the second clutch, the third clutch may be omitted.

Figure 3:
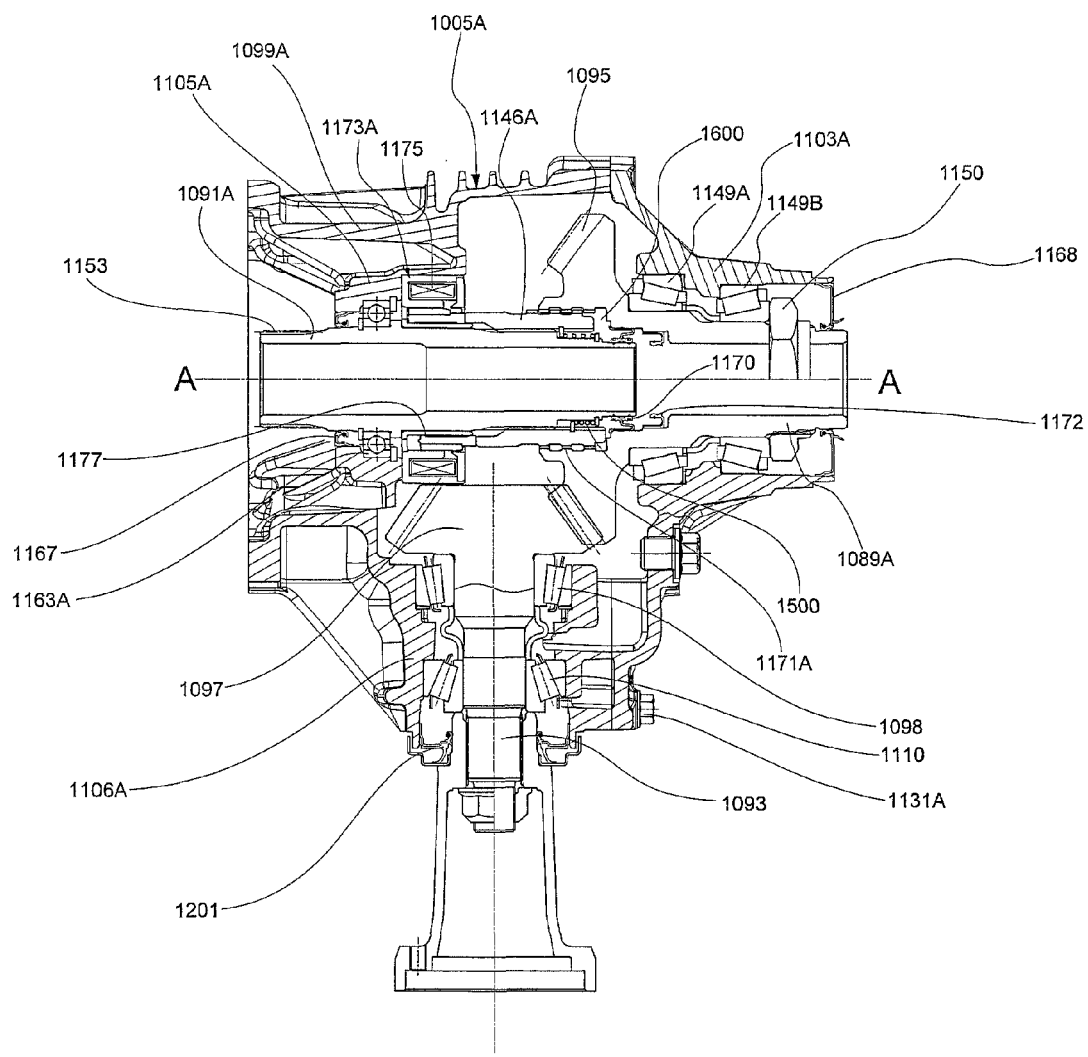
FIG. 3 is a cross-sectional view of a transfer apparatus (Example of Modifications of Embodiment 1).

FIG. 3 shows an example of the modifications of Embodiment 1. Further, in FIG. 3, the same or similar element will be denoted by the same reference numeral as that of FIG. 2 and the duplicated explanation thereof will be omitted. Further, in the transfer apparatus 1001 as shown in FIG. 2, the actuator 1173 is disposed on an opposite side of teeth of the ring gear 1095 with respect to the ring gear 1095 in a direction of the rotational axis of the transverse shaft 1089, 1091. In contrast, according to a transfer apparatus 1001A as shown in FIG. 3, an actuator 1173A is disposed on a side of teeth of a ring gear 1095 with respect to the ring gear 1095 in a direction of a rotational axis of a transverse shaft 1089A, 1091A.

The transfer apparatus 1001A of FIG. 3 includes a transverse shaft 1089A, 1091A and an orthogonal shaft 1093 which is orthogonal to the transverse shaft 1089A, 1091A. The transverse shaft includes a first transverse shaft 1091A and a second transverse shaft 1089A. The first transverse shaft 1091A and the second transverse shaft 1089A have a common rotational axis. In FIG. 3, the common rotational axis is shown by a line A-A.

The first transverse shaft 1091A is supported on a case 1005 by a bearing 1163A. A seal member 1167 is arranged between an outer peripheral of the first transverse shaft 1091A and the case 1005A. A seal member 1168 is arranged between an outer peripheral of the second transverse shaft 1089A and the case 1005A. A seal member 1170 is arranged between the first transverse shaft 1091A and the second transverse shaft 1089A. By these seal members 1167, 1168, 1170, a lubricant oil is sealed in an inside of the case 1005A. The seal member 1172 attached to an inner peripheral of the second transverse shaft 1089A is disposed between the second transverse shaft 1089A and a front intermediate shaft 1003 (refer FIG. 1), and acts for preventing a dust or the like from entering into the inner side of the case 1005A.

The ring gear 1095 is provided on the second transverse shaft 1089A. The second transverse shaft 1089A is supported on the case 1005A by a pair of bearings 1149A, 1149B which are disposed on the opposite side of the teeth of the ring gear 1095 with respect to the ring gear 1095. The bearing 1149A and the bearing 1149B are disposed with interval therebetween in the axial direction. By fitting a nut 1150 on a thread formed on an outer peripheral portion of the second transverse shaft 1089A, an axial positioning of the bearings 1149A, 1149B are fixed. On the orthogonal shaft 1093 (rear wheel output shaft 1093), a pinion gear 1097 is provided. The ring gear 1095 and the pinion gear 1097 are a pair of gears which are respectively bevel gears, and are in mesh with each other.

The case 1005A includes a main body 1099A and a cover 1103A. The main body 1099A and the cover 1103A are fitted with each other by fastening a bolt 1131A. The main body 1099A includes a first part 1105A for supporting the transverse shaft and a second part 1106A for supporting the orthogonal shaft. The main body 1099A accommodates the ring gear 1095 of the transverse shaft 1091A, 1089A and the orthogonal shaft 1093. The cover 1103A accommodates a shaft portion of the second transverse shaft 1089A supported by the pair of bearings 1149A, 1194B. The orthogonal shaft 1093 is supported on the main body 1099A at its rear end side through a pair of bearings 1098, 1110.

The actuator 1173A is disposed between a bearing 1163A that supports the first transverse shaft 1091A to the case 1005A and the ring gear 1095. A part of an outer peripheral of the actuator 1173A faces to the pinion gear 1097 at a leading end side of the pinion gear 1097 in direction of a rotational axis of the pinion gear 1097.

In an outer peripheral side of the first transverse shaft 1091A, the actuator 1173A which has a ring shape is disposed such that the actuator 1173A surrounds the first transverse shaft 1091A. That is, the first transverse shaft 1091A penetrates through a radially inner space of the ring shape actuator 1173A. In addition, the front intermediate shaft 1003 (refer FIG. 1) that penetrates the first transverse shaft 1091A also through the radially inner space of the ring shape actuator 1173A. An inside configuration of the actuator 1173A including for example a solenoid 1175, a plunger 1177 and the like is substantially the same with the actuator 1173 of FIG. 2. Further, according to the example of FIG. 3, the plunger 1177 is supported at an outer peripheral of an annular portion extended inward of the core surrounding the solenoid 1175.

On an outer peripheral side of the first transverse shaft 1091A, a movable body 1146A is provided. The movable body 1146A abuts with the plunger 1177 in a direction of the rotational axis of the transverse shaft 1091A, 1089A. The movable body 1146A is connected to the first transverse shaft 1091A in a spline-fitting manner. Thus, as for a rotational direction, the movable body 1146A rotates integrally with the first transverse shaft 1091A. In contrast, as for the axial direction, the movable body 1146A is relatively movable with respect to the first transverse shaft 1091A. The movable body 1146A is actuated by the actuator 1173A and moved in the axial direction. According to the example of FIG. 3, a part of the movable body 1146A is accommodated in an accommodating portion 1600 formed in a leading end of the second transverse shaft 1089A. According to the example of FIG. 3, the accommodating portion 1600 positioned in a radially inner side of the ring gear 1095.

Outer dog teeth respectively projecting radially outer side are provided on an outer peripheral of the movable body 1146A. In addition, inner dog teeth respectively projecting radially inner side are provided on an inner peripheral of the accommodating portion 1600. The outer dog teeth and the inner dog teeth configure a clutch device 1171A for connecting and interrupting a power transmission between the first transverse shaft 1091A and the second transverse shaft 1089A.

When the solenoid 1175 is activated, an axial thrust force is generated in a magnetic field to the plunger 1177, and the movable body 1146 abutting with the plunger 1177 moves in the axial direction so that the outer dog teeth of the movable body 1146A and the inner dog teeth of the accommodating portion 1600 are engaged with each other. Thereby, the movable body 1146A and the second transverse shaft 1089A are coupled so as to integrally rotate with reach other. As a result, the first transverse shaft 1091A and the second transverse shaft 1089A are coupled so as to integrally rotate with reach other. In contrast, when the solenoid 1175 is inactivated, the movable body 1146A moves toward a position where the engagement between the outer dog teeth of the movable body 1146A and the inner dog teeth of the accommodating portion 1600 are released by a urging force of a return spring 1500 provided between the movable body 1146A and the first transverse shaft 1091A. Further, in FIG. 3, an upper side of A-A line shows a condition in which the outer dog teeth of the movable body 1146A and the inner dog teeth of the accommodating portion 1600 are disengaged. A lower side of A-A line shows a condition in which the outer dog teeth of the movable body 1146A and the inner dog teeth of the accommodating portion 1600 are engaged with each other.

That is, by actuating the actuator 1173A, the first transverse shaft 1091A and the second transverse shaft 1089A are coupled so that the first transverse shaft 1091A and the second transverse shaft 1089A rotate integrally with each other. As a result, a power transmission path from the first transverse shaft 1091A to the rear wheel output shaft 1093 which is connected to the second transverse shaft 1089A by an engagement of the ring gear 1095 and the pinion gear 1097 is generated. In contrast, by not activating the actuator 1173A, the power transmission path from the first transverse shaft 1091A to the rear wheel output shaft can be disconnected.

Further, although a structure including the sleeve dog clutch (where outer dog teeth and inner dog teeth are opposed in a radial direction) is described referring to the example of FIG. 3, a structure of including opposing type dog clutch (such as FIG. 2, where dog teeth in one side and dog teeth in the other side are opposed in an axial direction) may be adopted even in the transfer apparatus in which the actuator 1173 is disposed in the position like FIG. 3.

Next, by referring to FIG. 4, a power system of a vehicle on which a power transmission apparatus according to Embodiment 2 and Embodiment 3 is mounted will be described as an example. Herein, although a power transmission apparatus 1 according to Embodiment 2 is applied to the power system, a power transmission apparatus according to another embodiment may be similarly applied to the power system.

Figure 4:
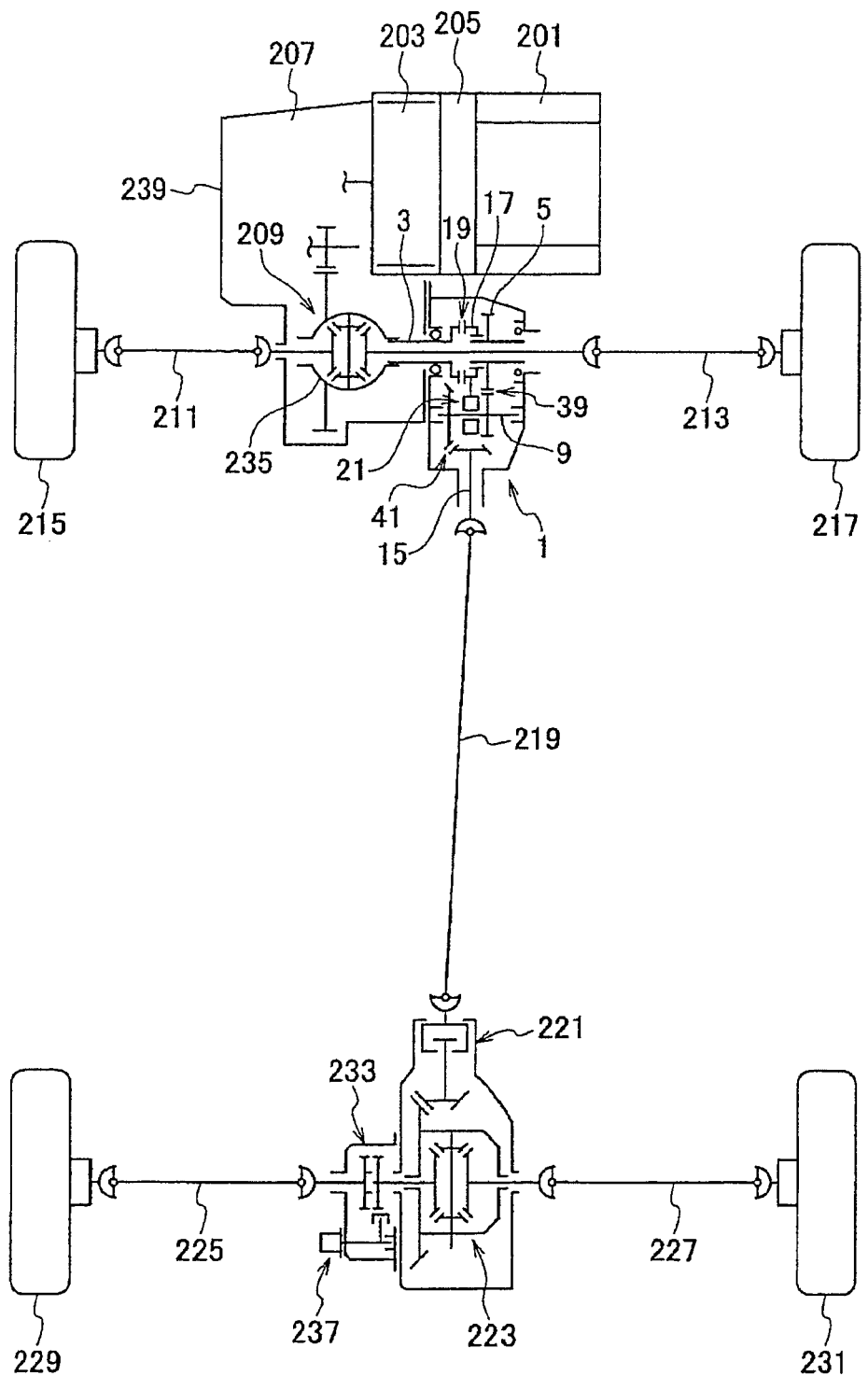
FIG. 4 is a schematic view illustrating a power system of a vehicle on which a power transmission apparatus according to embodiments.

As illustrated in FIG. 4, the power system of a vehicle includes a driving source, a transmission 207 as a shift mechanism, a front differential 209 for allowing a differential between left and right front wheels, front axles 211, 213, front wheels 215, 217, the power transmission apparatus 1, a propeller shaft 219, a coupling 221, a rear differential 223 for allowing a differential between left and right rear wheels, rear axles 225, 227, rear wheels 229, 231 and an axle disconnect 233 for interrupting a power transmission between the rear differential 223 and the rear axle 225. The driving source is provided with a clutch 205 for selectively interrupting between an engine 201 and an electric motor 203. When a driving torque is transmitted from a front wheel side to a rear wheel side, the coupling transmits the driving torque while generating a differential limit function.

In the power system of the vehicle thus configured, the driving torque of the drive source is transmitted to the front differential 209 via the transmission 207. The driving torque transmitted from the front differential 209 is distributed to the front wheels 215, 217 via the front axles 211, 213 and transmitted to the power transmission apparatus 1 via the input shaft 3 connected to a differential case 235

When a clutch device 19 is in a connected state, the driving torque transmitted to the power transmission apparatus 1 is transmitted to an intermediate shaft 9 via a gearshift set 39 and transmitted to an output shaft 15 via a turning gear set 41. The driving torque transmitted to the output shaft 15 is transmitted to the coupling 221 via the propeller shaft 219 and then transmitted to the rear differential 223. At this time, the axle disconnect 233 is in a connected state by a shifter 237 which is operated in synchronous with the interruption of the clutch device 19. Accordingly, the driving torque transmitted to the rear differential 223 via the coupling 221 is distributed from the rear axles 225, 227 to the rear wheels 229, 231. As a result, a vehicle is in a four wheel drive state (front and rear wheel drive state).

Further, when the clutch device 19 is in a disconnected state, a driving torque from a driving source is not transmitted to the drive transmission system after the input gear 5 and thus the vehicle is in a front wheel drive state (two wheel drive state). At this time, the axle disconnect 233 is in a disconnected state by the shifter 237 which is operated in synchronous with the interruption of the clutch device 19. Therefore, a rotation from the rear wheels 229, 231 due to the driving of the vehicle is not transmitted to the rear differential 223 and thus members of the power transmission system from the rear differential 223 up to the input gear 5 are not rotated. Consequently, the fuel consumption is improved. Hereinafter, a power transmission apparatus according to Embodiments 2 and 3 will be described by referring to FIGS. 5 and 6.

[Embodiment 2]

Figure 5:
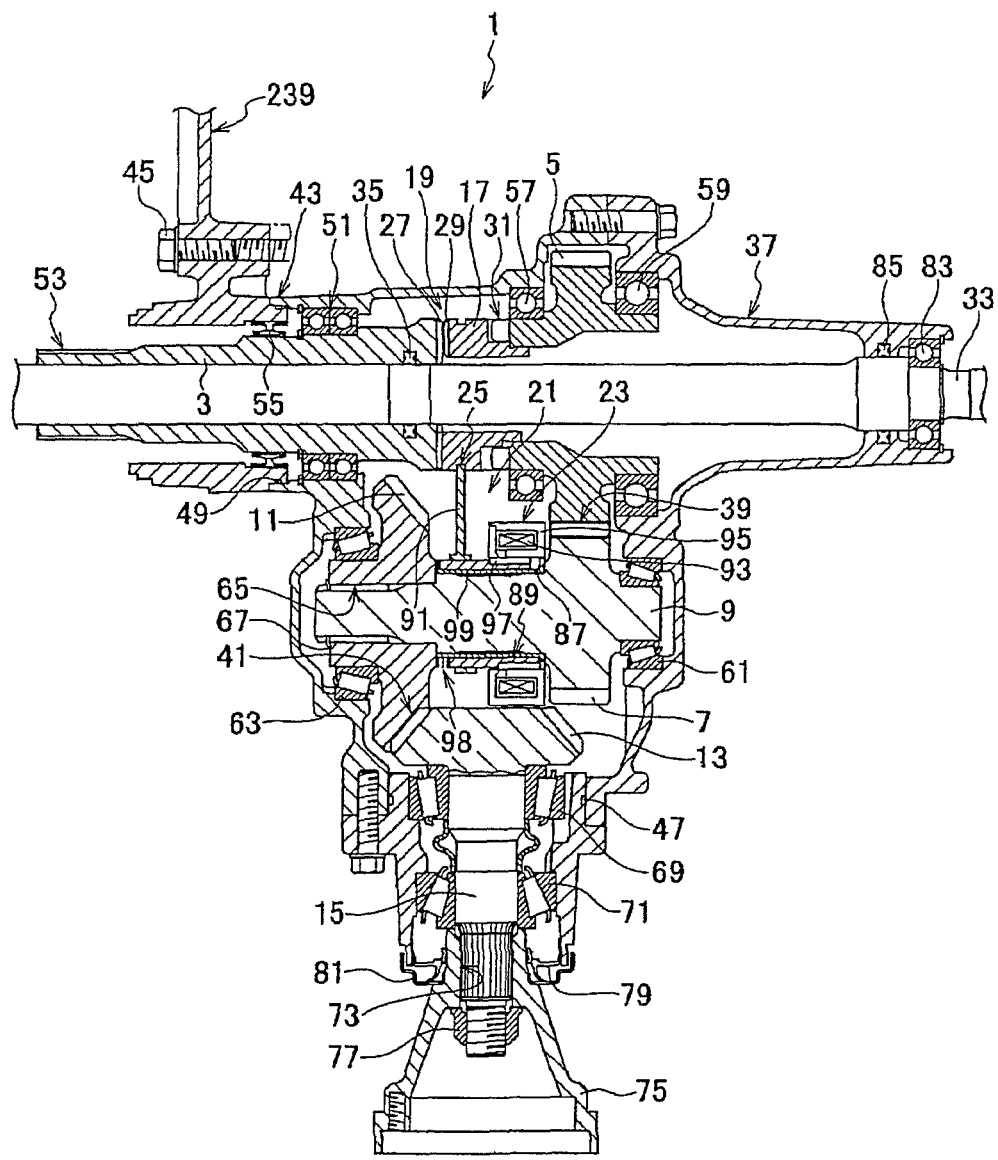
FIG. 5 is a sectional view of the power transmission apparatus according to Embodiment 2.

Referring to FIG. 5, Embodiment 2 of the present invention will be described.

The power transmission apparatus 1 according to the present embodiment includes an input shaft 3 into which a driving force is inputted, an input gear 5 rotationally driven by the driving force inputted into the input shaft 3, an intermediate gear 7 in mesh with the input gear 5, an intermediate shaft 9 provided to rotate integrally with the intermediate gear 7, an intermediate output gear 11 provided to rotate integrally with the intermediate shaft 9, an output gear 13 in mesh with the intermediate output gear 11 and an output shaft 15 provided to rotate integrally with the output gear 13.

And, a clutch member 17 is connected to the input gear 5 to move in an axial direction and rotate integrally therewith. Further, a clutch device 19 for interrupting a power transmission between the input shaft 3 and the input gear 5 is provided between the input shaft 3 and the clutch member 17. Furthermore, an actuator 21 for axially moving the clutch member 17 and interrupting the clutch device 19 is disposed on the intermediate shaft 9.

Further, the actuator 21 includes an electromagnet 23.

In addition, the clutch member 17 is provided with an operational part 25 which is moved axially by the actuator 21, and the clutch device 19 and the operational part 25 are positioned close to each other in the axial direction.

Further, the actuator 21 is interposed between the intermediate gear 7 and the intermediate output gear 11 in an axial direction.

The clutch device 19 is constituted by opposed teeth 27, 29 which are provided between the input shaft 3 and the clutch member 17 in an axial direction to oppose to each other and engaged with each other by an axial movement of the clutch member 17.

A cam for moving the clutch member 17 in the connecting direction of the clutch device 19 is formed on a connecting part 31 of the input gear 5 and the clutch member 17.

Further, a driving shaft 33 capable of rotating relative to the input shaft 3 is inserted through a radially inner side of the input shaft 3, a seal member 35 partitioning the interior of the input shaft 3 is provided between the input shaft 3 and the driving shaft 33 in a radial direction and an axial position of the seal member 35 is located close to the input shaft 3 side than the clutch device 19.

As illustrated in FIG. 5, the power transmission apparatus 1 includes a casing 37, the input shaft 3, a gearshift set 39, the intermediate shaft 9, a turning gear set 41, the output shaft 15, the clutch member 17 and the actuator 21.

The casing 37 includes a plurality of divided cases. An assembling part 43 is provided on a transmission case 239. The casing is assembled to the transmission case 239 at the assembling part 43 and fixed by a bolt 45. Further, O-ring 47 as a seal means is disposed on a joining part of the plurality of divided cases of the casing 37 and O-ring 49 as a seal means is disposed between the assembling part 43 and the transmission case 239. Herein, the input shaft 3, a gearshift set 39, the intermediate shaft 9, a turning gear set 41, the output shaft 15, the clutch member 17 and the actuator 21 are accommodated in the casing 37.

The input shaft 3 is formed in a hollow shape and rotatably supported on the casing 37 via two bearings 51 which are arranged in parallel in an axial direction. Further, a connecting part 53 with a spline shape is formed on an outer periphery of one end of the input shaft 3 in an axial direction. The differential case 235 (see, FIG. 4) of the front differential 209 is connected to the connecting part 53 to rotate integrally therewith. Further, a seal member 55 partitioning inside and outside of the casing 37 is provided in the portion of the assembling part 54 which is located between an outer peripheral surface of the input shaft 3 and an inner peripheral surface of the transmission case 239 in a diametric direction. A driving force is inputted from the differential case 235 connected to the connecting part 53 to the input shaft 3. The gearshift set 39 is rotationally driven by the driving force inputted to the input shaft 3.

The gearshift set 39 is constituted by a cylindrical helical gear set having a large diameter input gear 5 and a small diameter intermediate gear 7 and changes the driving force inputted to the input gear 5. Both sides of the input gear 5 in an axial direction are rotatably supported on the casing 37 via a pair of bearings 57, 59. The intermediate gear 7 is in mesh with the input gear 5.

The intermediate gear 7 is continued to one end of the intermediate shaft 9 to form a single piece. The intermediate gear 7 is in mesh with the input gear 5 and therefore the driving force from the input gear 5 is increased and transmitted to the intermediate shaft 9.

The intermediate shaft 9 has a rotational axis arranged parallel to the input shaft 3 and both sides thereof are rotatably supported on the casing 37 via a pair of bearings 61, 63. A connecting part 65 with a spline shape is formed on an outer periphery of the other end of the intermediate shaft 9. And, the intermediate output gear 11 constituting the turning gear set 41 is provided between a stepped portion formed on an outer periphery of the intermediate shaft 9 and a washer 67 as a fixing means fixed to the connecting part 65. Herein, the intermediate output gear 11 is provided on the outer periphery of the intermediate shaft 9 to rotate integrally therewith.

The turning gear set 41 is driven by a bevel gear set having the intermediate output gear 11 as a large diameter ring gear and the output gear 13 as a small diameter pinion gear and changes a direction of the driving force inputted to the intermediate shaft 9. The intermediate output gear 11 is rotationally driven by the driving force inputted to the intermediate shaft 9 and is in mesh with the output gear 13.

The output gear 13 is continued to one end of the output shaft 15 to form a single piece together with the output shaft 15. The output gear 13 is in mesh with the intermediate output gear 11. Accordingly, the driving force transmitted from the intermediate output gear 11 is turned and transmitted to the output shaft 15.

The output shaft 15 has a rotational axis arranged in a direction perpendicular to the intermediate shaft 9 and both sides thereof are rotatably supported on the casing 37 via a pair of bearings 69, 71. A connecting part 73 with a spline shape is formed on an outer periphery of the intermediate output shaft 15. Further, an output member 75 connected to the propeller shaft 219 (see, FIG. 4) is connected to the outer periphery of the intermediate output shaft 15 to rotate integrally therewith and an axial position thereof is fixed by a nut 77. Further, a seal member 79 partitioning inside and outside of the casing 37 is disposed between the output member 75 and the casing 37. Also, a dust cover 81 for protecting the seal member 79 from a bounced stones etc. is placed on the output member 75. As the clutch member 17 arranged between the input shaft 3 and the input gear 5 moves in an axial direction, the clutch device 19 is connected and a driving force is transmitted from the input shaft 3 side to the output shaft 15.

The clutch member 17 is formed with the connecting part 31 having a concave and convex shape. The input shaft 5 is formed with a connecting part having a concave and convex shape. The connecting part 31 is connected to the connecting part formed on the input shaft 5 to move in an axial direction and rotate integrally therewith. In the connecting part 31, cams having same slope are formed on an opposed surface of a concave and convex portion thereof in a rotational direction. When the clutch device 19 comes to a connected state by moving the clutch member 17 in a connecting direction of the clutch device 19 and the clutch member 17 is rotated by such a connection of the clutch device 19, the cams of the connecting part 31 are engaged at opposed surfaces thereof in a rotational direction. By doing so, the clutch member 17 is further moved in the connecting direction of the clutch device 19 and thus the connection state of the clutch device 19 is reinforced. The clutch device 19 is provided between the clutch member 17 and the input shaft 3 in an axial direction.

The clutch device 19 includes opposing teeth 27, 29 which are opposed to each other between the input shaft 3 and the clutch member 17 in an axial direction and engaged with each other by an axial movement of the clutch member 17. As the opposing teeth 27, 29 are engaged with each other, a power transmission between the input shaft 3 and the input gear 5 is allowed and a driving force thereof is transmitted to the power transmission path after the input gear 5 and outputted to the output shaft 15. Further, when the engagement of the opposing teeth 27, 29 is released, the clutch member 17 is not rotated and thus a driving force thereof is not transmitted to the power transmission path after the input gear 5. Accordingly, it is possible to minimize the number of parts being rotationally driven by a driving force from the driving source of the power transmission apparatus 1 in a disconnected state of the clutch device 19, thereby improving the fuel consumption.

Herein, the driving shaft 33 connecting the front differential 209 (see, FIG. 4) and the front axle (see, FIG. 4) is inserted through a radially inner side of the input shaft 3 to rotate relative to the input shaft 3. The seal member 35 is provided between the driving shaft 33 and the input shaft 3 in a radial direction. The seal member 35 includes a seal means partitioning the interior of the input shaft 3 and X-ring as a sliding member.

An axial position of the seal member 35 is located close to the input shaft 3 side than the clutch device 19. A lubricant flowing from the transmission case 239 side to a space between an inner periphery of the input shaft 3 and an outer periphery of the driving shaft 33 is prevented from flowing into the casing 37 by arranging the seal member 35 thus configured. Further, although a lubricant different from the lubricant reserved in the transmission case 239 is included in the casing 37, the lubricant included in the casing 37 is circulated while being raised by a gear such as the gearshift set 39 or turning gear set 41.

Therefore, although circulation of the lubricant in the casing 37 is suppressed in a disconnected state of the clutch device 19, the members after the clutch member 17 and the input gear 5 are not rotationally driven and thus sliding in the casing 37 is reduced. As a result, it is possible to reduce an amount of the lubricant included in the casing 37. Further, since a sliding occurs between the casing 37 adjacent to a bearing 83 supporting the driving shaft 33 and the driving shaft 33 even in the disconnected state of the clutch device 19, the seal means and non-lubricated X ring 85 as a sliding member are arranged and also a seal bearing capable of self-lubricating is employed as the bearing 83.

The clutch member 17 for interrupting the clutch device 19 is axially moved by the actuator 21 arranged on the intermediate shaft 9. The actuator 21 is disposed over an annular support member 87 between the intermediate gear 7 and the intermediate output gear 11 in an axial direction and includes the electromagnet 23, a moveable member 89 and a shift fork 91. The support member 87 is arranged on an outer periphery of the intermediate shaft 9 and formed from a non-magnetic material. The actuator 21 has a ring shape and the intermediate shaft 9 as well as a rotational axis of the intermediate shaft 9 penetrates through a radially inner space of the ring shape actuator 21.

The electromagnet 23 is prevented from rotating relative to the casing 37 by an anti-rotation member (not-illustrated) and includes an electromagnetic coil 93 and a core 95. The electromagnetic coil 93 is molded by a resin and received in the core 95. The core 95 is formed from a magnetic material and has a lead wire (not-illustrated) connected to the electromagnetic coil 93. The lead wire is drawn out of the casing 37 and connected to a controller (not-illustrated). Energization of the electromagnetic coil 93 is controlled by the controller. The moveable member 89 is disposed on an inner diameter side of the electromagnet 23 and the energization of the electromagnet 23 causes the moveable member 89 to move.

The moveable member 89 includes a plunger 97 and a moving member 99. The plunger 89 is formed from a magnetic material and includes an air gap through which a magnetic flux can penetrate. The plunger 89 is placed on an inner diameter side of the electromagnet 23. The moving member 99 is integrally fixed to an inner periphery of the plunger 97.

The moving member 99 is formed from a non-magnetic material and prevents the magnetic flux from being leaked from an inner peripheral side of the plunger 97 toward the intermediate shaft 90. Further, the moving member 99 is placed on an outer periphery of the support member 87 to move in an axial direction. A return spring 98 is arranged between the moving member 99 and the intermediate output gear 11 in an axial direction and urges the moving member 99 in a disconnecting direction of the clutch device 19. The shift fork 91 is fixed to the moving member 99.

An inner diameter side of the shift fork 91 is fixed to an outer periphery of the moving member 99 to move integrally with the moving member 99 in an axial direction. An outer diameter side of the shift fork 91 is fitted into the operational part 25 which is constituted by an annular recess formed on the clutch member 17. Axial position of the operational part 25 is located close to the clutch device 19 and thus an axial size of the clutch member 17 is small. And, an interrupt response of the clutch device 19 in accordance with an actuation of the actuator 21 is improved. The shift fork 91 is moved axially and integrally by the axial movement of the moving member 99. And, the shift fork 91 causes the operational part 25 to move the clutch member 17 in a connecting direction of the clutch device 19, thereby making the clutch device 19 into a connected state.

In the power transmission apparatus 1 thus configured, the plunger 97 is moved toward the intermediate output gear 11 and the moving member 99 is moved against the urging force of the return spring 98 by effectively using a shortest magnetic flux loop of magnetic flux which is created by excitation of the electromagnet 23 and penetrates through the core 95 and the plunger 97. This state is illustrated in a radially upper side of the intermediate shaft 9 in FIG. 5. The shift fork 91 is moved axially and integrally by movement of the moveable member 89 and causes the operational part 25 to the clutch member 17 in a connecting direction of the clutch device 19. Accordingly, the opposing teeth 27, 29 are engaged with each other to make the clutch device 19 into a connected state. This state is illustrated in a radially lower side of the clutch device 19 in FIG. 5. A power transmission between the input shaft 3 and the clutch member 17 is allowed by such a connection of the clutch device 19 and thus a driving force is transmitted to a power transmission path after the input gear 5.

Further, the clutch device 19 is disconnected as follows. First, as energization of the electromagnet 23 is released, the moving member 99 is moved toward the intermediate gear 7 by the urging force of the return spring 98. This state is illustrated in a radially lower side of the intermediate shaft 9 in FIG. 5. The shift fork 91 is moved axially and integrally by movement of the moving member 99 and causes the operational part 25 to the clutch member 17 in a disconnecting direction of the clutch device 19. Accordingly, the opposing teeth 27, 29 are disengaged from each other to make the clutch device 19 into a disconnected state. This state is illustrated in a radially upper side of the clutch device 19 in FIG. 5. A power transmission between the input shaft 3 and the clutch member 17 is blocked by such a disconnection of the clutch device 19 and thus a driving force is not transmitted to a power transmission path after the input gear 5. At this time, the axle disconnect 233 illustrated in FIG. 4 is also in a disconnected state, as mentioned above. Therefore, a rotation from the rear wheels 229, 231 due to the driving of the vehicle is not transmitted to the rear differential 223 and thus members of the power transmission system from the rear differential 223 up to the input gear 5 are not rotated.

In this power transmission apparatus 1, since the clutch member 17 is connected to the input gear 5 to move in an axial direction and rotate integrally therewith and the clutch device 19 for interrupting a power transmission between the input shaft 3 and the input gear 5 is provided between the input shaft 3 and the clutch member 17, a driving force is not transmitted from the input gear 5 toward a power transmission path after the input gear in a disconnected state of the clutch device 19. Accordingly, it is possible to improve the fuel consumption. Further, it is not necessary to secure a moving stroke of the clutch member 17 in the intermediate shaft 5 and thus an axial size of the power transmission apparatus can be reduced.

Further, since the intermediate shaft 9 is provided with an actuator 21 for axially moving the clutch member 17 and interrupting the clutch device 19, it is possible to avoid interference with the surrounding members around the input shaft 3. Accordingly, it is possible to easily change the design of the actuator 21 and to improve the interruption property of the clutch device 19. And, it is possible to eliminate a member protruding out of the power transmission apparatus 1 in a radial direction and thus to reduce a diametrical size of the power transmission apparatus.

Accordingly, in such a power transmission apparatus 1, since a power is not transmitted to the intermediate shaft 9 side in a disconnected state of the clutch device 19, the axial or diametrical size of the power transmission apparatus can be reduced. Consequently, it is possible to make the power transmission apparatus in a compact size while improving the fuel consumption.

Further, since the actuator 21 includes the electromagnet 23, the electromagnet 23 as a small motivating source can be placed within the casing 37. Therefore, the size of the power transmission apparatus can be reduced. And, since the actuation of the actuator 21 is controlled in accordance with energization of the electromagnet 23, it is possible to improve operational accuracy of the clutch member 17 and to improve an interruption property of the clutch device 19.

Further, since the clutch member 17 is provided with the operational part 25 which is moved axially by the actuator 21 and the clutch device 19 and the operational part 25 are positioned close to each other in the axial direction, it is possible to reduce an axial size of the clutch member 17 and to improve an interrupt response of the clutch device 19 by actuation of the actuator 21.

Further, since the actuator 21 is interposed between the intermediate gear 7 and the intermediate output shaft 11 in an axial direction, the actuator 21 does not protrude axially over the intermediate shaft 9. Accordingly, it is possible to reduce the size of the power transmission apparatus.

Further, since the clutch device 19 is constituted by opposed teeth 27, 29 which are provided between the input shaft 3 and the clutch member 17 in an axial direction to oppose to each other and engaged with each other by an axial movement of the clutch member 17, it is possible to shorten a moving stroke of the clutch member 17 and to improve connection stability of the clutch device 19.

Further, since a cam for moving the clutch member 17 in the connecting direction of the clutch device 19 is formed on the connecting part 31 of the input gear 5 and the clutch member 17, it is possible to securely maintain the connected state of the clutch device 19.

Further, since a seal member 35 is provided between the input shaft 3 and the driving shaft 33 in a radial direction and an axial position thereof is located close to the input shaft 3 than the clutch device 19, it is possible to prevent a lubricant flowing between an inner periphery of the input shaft 3 and an outer periphery of the driving shaft 33 from being leaked into the clutch device 19, irrespective of the position of the clutch device 19. Accordingly, it is possible to avoid inclusion of the lubricant.

[Embodiment 3]

Embodiment 3 will be described by referring to FIG. 6.

In the power transmission apparatus 101 according to the present embodiment, a clutch member 103 is connected to the input gear 5 to move in an axial direction and rotate integrally therewith, the clutch device 19 for interrupting a power transmission between the input shaft 3 and the input gear 5 is provided between the input shaft 3 and the clutch member 103 and the intermediate shaft 9 is provided with an actuator 105 for axially moving the clutch member 103 and interrupting the clutch device 19.

In addition, the actuator 105 includes a cam mechanism 107. Herein, the same or similar element will be denoted by the same reference numeral as that of Embodiment 2 and the duplicated explanation thereof will be omitted. In this case, it is possible to achieve the same effect as Embodiment 2.

Figure 6:
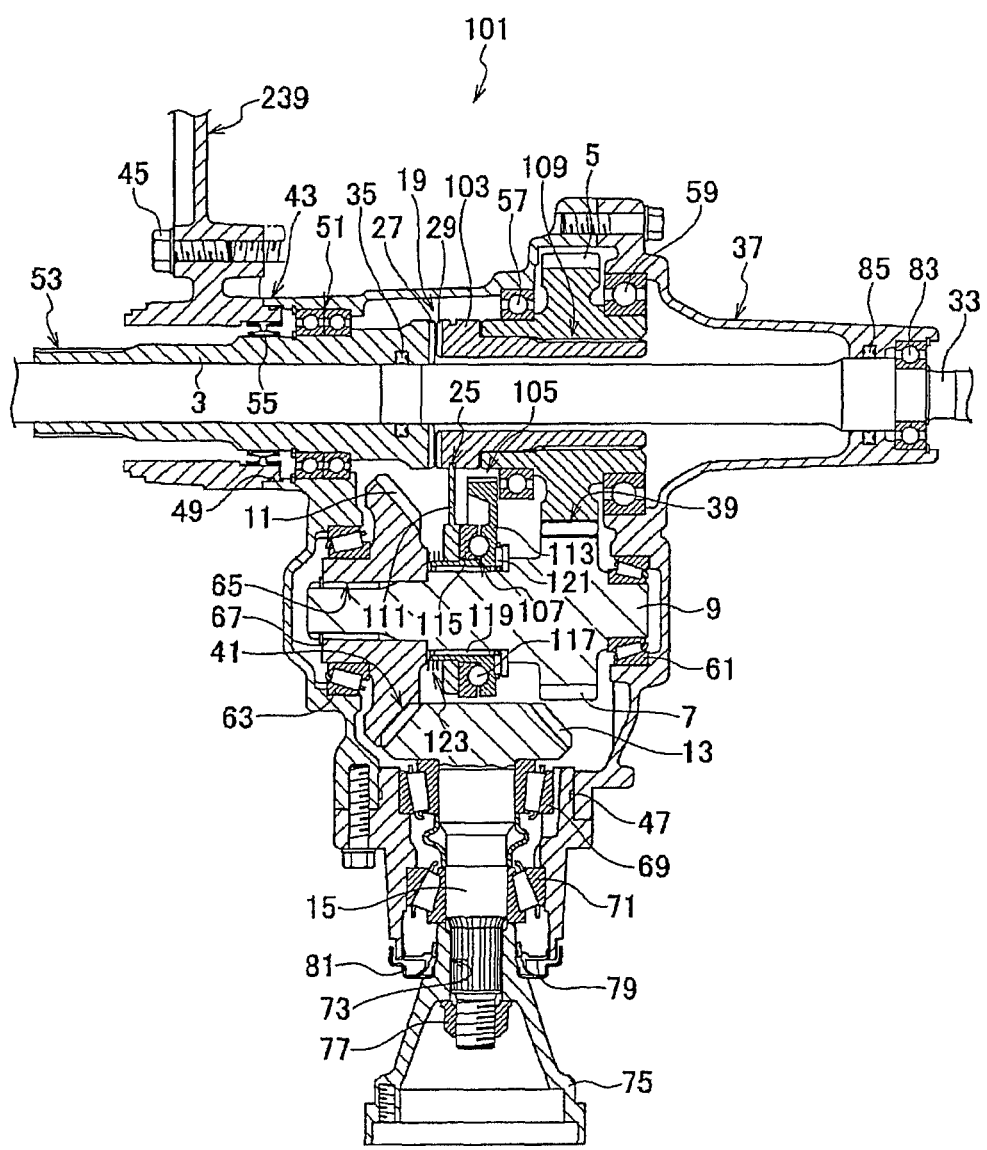
FIG. 6 is a sectional view of the power transmission apparatus according to Embodiment 3.

As illustrated in FIG. 6, the clutch member 103 is formed at its outer periphery with a connecting part 109 having a spline shape. The input shaft 5 is formed at its inner periphery with a connecting part having a spline shape. The connecting part 109 is connected to the connecting part formed on the input shaft 5 to move in an axial direction and rotate integrally therewith. The clutch member 17 is axially moved by the actuator 105 arranged on the intermediate shaft 9. The actuator 21 is disposed between the intermediate gear 7 and the intermediate output gear 11 in an axial direction over an outer periphery of the intermediate shaft 9 and includes the cam mechanism 107 and a shift fork 101.

The cam mechanism 107 includes a gear member 113, a cam ring 115 and a cam ball 117. The gear member 113 includes an inner diameter side which is arranged to rotate relative to the intermediate shaft 9 via a needle bearing 119. Further, a thrust bearing 121 for supporting a thrust reaction generated by the cam mechanism 107 is provided between the gear member 113 and the intermediate shaft 9 in an axial direction. The gear member 113 is engaged with a motor shaft of an electric motor (not-illustrated) and rotated by actuation of the electric motor.

The cam ring 115 is arranged on an outer periphery of the gear member 113 to move in an axial direction and prevented from being rotated relative to the casing 37. The cam ring 115 is axially moved toward the intermediate output gear 11 in accordance with the thrust reaction generated by the cam mechanism 107 to forcibly move the shift fork 111.

The cam ball 117 is arranged to oppose cam surfaces formed around the gear member 113 and the cam ring 115 and interposed between the am surfaces. Differential rotation is generated between the gear member 113 and the cam ring 115 by rotation of the gear member 113. Thereby, the cam ball 117 generates a cam thrust force for axially urging the cam ring 115 toward the intermediate output gear 11. The shift fork 111 is axially moved by the cam mechanism 107.

The shift fork 111 is arranged on an outer periphery of the gear member 113 to move in an axial direction and placed close to the cam ring 115 in an axial direction. Further, a return spring 123 for urging the shift fork 111 in a disconnecting direction of the clutch device 19 is provided between the shift fork 111 and the intermediate output gear 11 in an axial direction. As the cam ring 115 is axially moved by a cam thrust force generated by the cam mechanism 107, the shift fork 111 is axially urged against an urging force of the return spring 123 and causes the operational part 25 to move the clutch member 103 in a connecting direction of the clutch device 19, thereby interrupting the clutch device 19.

In the power transmission apparatus 1 thus configured, as differential rotation is generated between the gear member 113 and the cam ring 115 by actuation of an electric motor, the cam ring 115 is moved toward the intermediate output gear 11 and the shift fork is forcibly moved against an urging force of the return spring 123. The operational part 25 causes the clutch member 103 to move in a connecting direction of the clutch device 19 by such a movement of the shift fork 111. Accordingly, the opposing teeth 27, 29 are engaged with each other to make the clutch device 19 into a connected state. A power transmission between the input shaft 3 and the clutch member 103 is allowed by such a connection of the clutch device 19 and thus a driving force is transmitted to a power transmission path after the input gear 5.

Further, the clutch device 19 is disconnected as follows. First, the gear member 113 is reversely rotated by operating the electric motor in a reverse rotation and thus the cam ball 117 is arranged in an initial position thereof. At this time, the shift fork 111 is moved toward the intermediate gear 7 by the urging force of the return spring 123 and thus the cam ring 115 is arranged in an initial position thereof. The operational part 25 causes the clutch member 103 to move in a disconnecting direction of the clutch device 19 by such a movement of the shift fork 111. Accordingly, the opposing teeth 27, 29 are disengaged from each other to make the clutch device 19 into a disconnected state. A power transmission between the input shaft 3 and the clutch member 103 is blocked by such a disconnection of the clutch device 19 and thus a driving force is not transmitted to a power transmission path after the input gear 5.

In the power transmission apparatus 1 thus configured, since the clutch member 103 is connected to the input gear 5 to move in an axial direction and rotate integrally therewith and the clutch device 19 for interrupting a power transmission between the input shaft 3 and the input gear 5 is provided between the input shaft 3 and the clutch member 103, a driving force is not transmitted from the input gear 5 toward a power transmission path after the input gear in a disconnected state of the clutch device 19. Accordingly, it is possible to improve the fuel consumption. Further, it is not necessary to secure a moving stroke of the clutch member 103 in the intermediate shaft and thus an axial size of the power transmission apparatus can be reduced.

Further, since the intermediate shaft 9 is provided with an actuator 105 for axially moving the clutch member 103 and interrupting the clutch device 19, it is possible to avoid interference with the surrounding members around the input shaft 3. Accordingly, it is possible to easily change the design of the actuator 105 and to improve the interruption property of the clutch device 19. And, it is possible to eliminate a member protruding out of the power transmission apparatus 101 in a radial direction and thus to reduce a diametrical size of the power transmission apparatus.

Accordingly, in such a power transmission apparatus 101, since a power is not transmitted to the intermediate shaft 9 side in a disconnected state of the clutch device 19, the axial or diametrical size of the power transmission apparatus can be reduced. Consequently, it is possible to make the power transmission apparatus in a compact size while improving the fuel consumption.

Further, since the actuator 105 includes the cam mechanism 107, it is possible to generate a large operating force of the clutch member 103 with a small motive force. Accordingly, it is possible reduce the size of the power transmission apparatus and to improve operational stability of the clutch member 103.

In the power transmission apparatus according to the present embodiment, an electromagnet or electric motor is illustratively used as a motivating source for actuating the actuator. However, the motivating source for actuating the actuator may take any other configuration, as long as it can axially move the clutch member such as a shift rod for directly moving the shift fork or a hydraulic cylinder piston.

Further, the clutch member may be connected to any one of the input shaft or the input gear to move in an axial direction and rotate integrally therewith when the clutch device is in a disconnected state. If the clutch member is normally connected to the input gear side, it is possible to stop actuation of the clutch member in a disconnected state of the clutch device. Accordingly, it is possible to reduce a sliding resistance of sliding parts or a stirring resistance of lubricant. On the contrary, if the clutch member is normally connected to the input shaft side, it is possible to inject lubricant to the sliding parts by normally rotating the clutch member. Accordingly, it is possible to improve actuation response of the clutch member.

Although in the above embodiments and modifications the actuator 1173, 1173A, 21 actuates the movable body 1146, 1146A, 99, a configuration in which the actuator itself moves in the axial direction so as to move the clutch device 1171, 1171A, 19 in the axial direction may be adapted. In this configuration, it is preferable that the actuator includes the electromagnetic solenoid.

The clutch device 1171, 1171A, 19 may be provided with a detector for detecting a connecting/disconnecting condition of the clutch device. The detector may be a position switch in which an actual position of the clutch device is detected directly or indirectly through one or more members, or the detector may be a non-contact type in which the connecting/disconnecting condition is determined based on a change of a magnetic field or an electrical potential based on a movement of the clutch device or the electromagnetic solenoid.

The power transmission apparatus of the embodiment may be attached to a rear differential device in a rear power-train of a vehicle of a FF (front engine/front drive) base power-train system.

In accordance with the above embodiments and modifications, a power transmission apparatus may include a first rotational member (e.g. the inner sleeve 1091 of FIG. 2, the first transverse shaft 1091A of FIG. 3, and the input shaft 3 of FIGS. 5 and 6); a second rotational member (e.g. the outer sleeve 1089 of FIG. 2, the second transverse shaft 1089A of FIG. 3, and the intermediate shaft 9 of FIGS. 5 and 6); a clutch device (1171, 1171A, 19) adapted to connect and interrupt a power transmission between the first rotational member 1091, 1091A, 3 and the second rotational member 1089, 1089A, 9; and an actuator 1173, 1173A, 21 adapted to actuate the clutch device 1171, 1171A, 19. The actuator 1171, 1171A, 19 may be an electromagnetic actuator having a ring shape. A part of one (1089, 1091A, 9) of the first rotational member and the second rotational member and a rotational axis of said one (1089, 1091A, 9) of the first rotational member and the second rotational member pass through a radially internal space of the ring shape actuator 1171, 1171A, 19.

Moreover, in the above structure, the power transmission apparatus may further include a third rotational member (e.g. the rear wheel output shaft 1093 of FIG. 2). The first rotational member 1091 may be concentrically disposed within the second rotational member 1089. A first gear (e.g. the side gear 1095 of FIG. 2) may be provided on the second rotational member 1089. A second gear (e.g. the pinion gear 1097 of FIG. 2) which is in mesh with the first gear 1095 may be provided on the third rotational member 1093. The second rotational member 1089 may be supported on a case 1005 by bearings 1107, 1149 in both sides of the first gear 1095. An end of the second rotational member 1089 may extend toward a position between the bearings 1107, 1149. A support part 1143 may be formed on an extended portion of the second rotational member 1089. A movable body 1146 which is actuated by the actuator 1173 may be supported on the support part 1143. An opposed part 1161 opposed to the movable body 1146 may be provided on the first rotational member 1091. The clutch device 1171 operated by a movement of the movable body 1146 is disposed between the movable body 1146 and the opposed part 1161.

In the above structure, the case 1005 may include a detachable intermediate wall 1101 that supports one 1194 of said bearings and the actuator 1173.

In the above structure, the clutch device 1171 may include a dog clutch.

In the above structure, a rotational axis of the third rotational member 1093 may be orthogonal to a common rotational axis of the first rotational member 1091 and the second rotational member 1089.

Moreover, in the above structure, the power transmission apparatus may further include: a third rotational member (e.g. the orthogonal shaft 1093 of FIG. 3). The first rotational member (e.g. the first transverse shaft 1091A of FIG. 3) and the second rotational member (e.g. the second transverse shaft 1089A of FIG. 3) may have a common rotational axis. A rotational axis of the third rotational member 1093 may be orthogonal to the common rotational axis of the first rotational member 1091A and the second rotational member 1089A. A first gear (e.g. the side gear 1095 of FIG. 3) may be provided on the second rotational member 1089A. A second gear (e.g. the pinion gear 1097 of FIG. 3) which is in mesh with the first gear 1095 may be provided on the third rotational member 1093. The actuator 1173A is disposed on a side of teeth of the first gear 1095 with respect to the first gear 1095 in a direction of the common rotational axis of the first rotational member 1091A and the second rotational member 1089A.

In the above structure, the second rotational member 1089A may be supported on a case 1005 by two or more bearings 1149A, 1149B which are disposed on an opposite side of the teeth of the first gear 1095 with respect to the first gear 1095 in a direction of the common rotational axis of the first rotational member 1091A and the second rotational member 1089A.

In the above structure, the actuator 1173A may be disposed between a bearing 1163A that supports the first rotational member 1091A to a case 1005 and the first gear 1095.

In the above structure, the actuator 1173A may be disposed in a leading end side of the second gear 1097 in a rotational axis of the second gear 1097.

Moreover, in the above structure, the power transmission apparatus may further include: an input gear 5 having a common rotational axis with the first rotational member (e.g. the input shaft 3 of FIGS. 5 and 6); an intermediate gear 7 which is provided to rotate integrally with the second rotational member (e.g. the intermediate shaft 9 of FIGS. 5 and 6) and is in mesh with the input gear 5; an intermediate output gear 11 provided to rotate integrally with the second rotational member 9; an output gear 13 in mesh with the intermediate output gear 11; and a third rotational member (e.g. the output shaft 15 of FIGS. 5 and 6) provided to rotate integrally with the output gear 11. The clutch member 19 may be disposed between the first rotational member 3 and the input gear 5. The actuator 21 may be disposed on the second rotational member 9.

In the above structure, a clutch member 17 may be connected to one of the input gear 5 and the first rotational member 3 so as to be movable in an axial direction and rotate integrally therewith. The clutch member 17 may be provided with an operational part 25 which is axially moved by the actuator 21. The clutch device 19 and the operational part 25 may be positioned close to each other in the axial direction.

In the above structure, the actuator 21 may be interposed between the intermediate gear 7 and the intermediate output gear 11 in an axial direction.

In the above structure, the clutch device 19 may include opposed teeth 27, 29 which are provided between the first rotational member 3 and the clutch member 17 to oppose to each other in an axial direction, and which are engaged with each other by an axial movement of the clutch member 17.

In the above structure, a cam adapted to move the clutch member 17 in a direction for connecting the clutch device 19 may be formed on a connecting part 31 for connecting the input gear 5 and the clutch member 17.

In the above structure, a driving shaft 33 capable of rotating relative to the first rotational member 3 may be inserted through a radially inner side of the first rotational member 3. A seal member 35 that partitions an interior of the first rotational member 3 may be provided between the first rotational member 3 and the driving shaft 33 in a radial direction. An axial position of the seal member 35 may be located close to the first rotational member 3 than the clutch device 19.

Furthermore, in accordance with the above embodiments and the modifications, a power transmission apparatus may include: a transverse shaft 1089, 1091 rotatably supported on a case 1005; a orthogonal shaft 1093 rotatably supported on the case 1005 and arranged orthogonal to the transverse shaft 1008, 1091; a first gear 1095 provided on the transverse shaft 1089, 1091; and a second gear 1097 in mesh with the first gear 1095 and provided on the orthogonal shaft 1093. The transverse shaft may include an outer sleeve 1089 on which the first gear 1095 is supported and an inner sleeve 1091 which is concentrically disposed within the outer sleeve 1089. The outer sleeve 1089 may be supported on the case 1005 by bearings 1107, 1149 which are provided in both sides of the first gear 1095. An end of the outer sleeve 1089 may extend outward between the bearings 1107, 1149 to provide a support part 1143. A movable body 1146 may be supported on the support part 1143. An opposed part 1161 which is opposed to the movable body 1146 may be provided on the inner sleeve 1091. A clutch device 1171 adapted to connect and interrupt a coupling between the movable body 1146 and the opposed part 1161 by a movement of the moveable body 1146 may be provided between the movable body 1146 and the opposed part 1161. An actuator 1173 adapted to actuate the moveable body 1146 may be provided on a side of the case 1005.

According to the above structure, it is possible to release the first gear from a constraint by the movable body and thus to select a size of a diameter of the first gear. Accordingly, it is possible to increase a degree of design freedom.

In the above structure, the case 1005 may include a detachable intermediate wall 1101 which supports one 1149 of the bearings 1107, 1149 and the actuator 1173.

In the above structure, the actuator may be a solenoid actuator 1173.

In the above structure, the clutch device 1171 may be constituted with a dog clutch.

Furthermore, in accordance with the above embodiments and modifications, a power transmission apparatus may include: an input shaft 3 into which a driving force is inputted, an input gear 5 rotationally driven by a driving force inputted into the input shaft 3, an intermediate gear 7 in mesh with the input gear 5, an intermediate shaft 9 provided to rotate integrally with the intermediate gear 7, an intermediate output gear 11 provided to rotate integrally with the intermediate shaft 9, an output gear 13 in mesh with the intermediate output gear 11; and an output shaft 15 provided to rotate integrally with the output gear 15. A clutch member 17 which is movable in an axial direction may be connected to one of the input gear 5 and the input shaft 3 so as to rotate integrally with said one of the input gear 5 and the input shaft 3. A clutch device 19 adapted to connect and interrupt a power transmission between the input shaft 3 and the input gear 5 may be provided between the other of the input gear 5 and the input shaft 3 and the clutch member 17. An actuator 21 adapted to axially move the clutch member 17 and actuate the clutch device 19 may be disposed on the intermediate shaft 9.

According to the above structure, since the clutch member is connected to any one of the input gear and the input shaft to move in an axial direction and rotate integrally therewith and the clutch device for interrupting a power transmission between the input shaft and the input gear is provided between the input shaft and the clutch member, a driving force is not transmitted from the input gear toward a power transmission path after the input gear in a disconnected state of the clutch device. Accordingly, it is possible to improve the fuel consumption. Further, it is not necessary to secure a moving stroke of the clutch member in the intermediate shaft and thus an axial size of the power transmission apparatus can be reduced.

Further, since the intermediate shaft is provided with an actuator for axially moving the clutch member and interrupting the clutch device, it is possible to avoid interference with the surrounding members around the input shaft. Accordingly, it is possible to easily change the design of the actuator and to improve the interruption property of the clutch device. And, it is possible to eliminate a member protruding out of the power transmission apparatus in a radial direction and thus to reduce a diametrical size of the power transmission is apparatus.

Accordingly, in such a power transmission apparatus, since a power is not transmitted to the intermediate shaft side in a disconnected state of the clutch device, the axial or diametrical size of the power transmission apparatus can be reduced. Consequently, it is possible to make the power transmission apparatus in a compact size while improving the fuel consumption.

According to the above structure, there is an effect that it is possible to provide a power transmission apparatus capable of being made in a compact size while improving the fuel consumption.

In the above structure, the clutch member 17 may be provided with an operational part 25 which is axially moved by the actuator 21. The clutch device 17 and the operational part 25 may be positioned close to each other in the axial direction.

In the above structure, the actuator 21 may be interposed between the intermediate gear 7 and the intermediate output gear 11 in an axial direction.

In the above structure, the clutch device 19 may include opposed teeth 27, 29 which are provided between the input shaft 3 and the clutch member 17 in an axial direction to oppose to each other and engaged with each other by an axial movement of the clutch member 17.

In the above structure, a cam adapted to move the clutch member 17 in a direction for connecting the clutch device 19 may be formed on a connecting part 31 of the input gear 5 and the clutch member 17.

In the above structure, a driving shaft 33 capable of rotating relative to the input shaft 3 may be inserted through a radially inner side of the input shaft 3. A seal member 35 that partitions an interior of the input shaft 3 may be provided between the input shaft 3 and the driving shaft 33 in a radial direction. An axial position of the seal member 35 may be located close to the input shaft 3 than the clutch device 19.

In the above structure, the actuator 21 may include an electromagnet.

What is claimed is:
1. A power transmission apparatus comprising:
 a case;
 an outer sleeve on which a gear is supported;

an inner sleeve which is concentrically disposed within the outer sleeve;

a first bearing that supports the inner sleeve;

a second bearing and a third bearing that supports the outer sleeve on the case in both sides of the gear;

a clutch device disposed between the first bearing and the third bearing in a direction of a common rotational axis of the outer sleeve and the inner sleeve and adapted to connect and interrupt a power transmission between the outer sleeve and the inner sleeve; and a ring shape actuator adapted to generate a driving force for actuating the clutch device, wherein the power transmission between the outer sleeve and the inner sleeve is executed by passing a transmitting power through a radially internal space of the ring shape actuator from the clutch device, and wherein the power transmission between the outer sleeve and the inner sleeve is executed by passing the transmitting power through the radially internal space of the ring shape actuator from one side of the ring shape actuator to the other side of the ring shape actuator in the direction of the common rotational axis.

2. The power transmission apparatus according to claim 1, wherein the actuator is a solenoid actuator.

3. The power transmission apparatus according to claim 1, wherein the clutch device is constituted with a dog clutch.

4. The power transmission apparatus according to claim 1, wherein the ring shape actuator is disposed between the first bearing and the third bearing in the direction of the common rotational axis of the outer sleeve and the inner sleeve.

5. A power transmission apparatus comprising:

a case;

an outer sleeve on which a gear is supported;

an inner sleeve which is concentrically disposed within the outer sleeve;

a first bearing that supports the inner sleeve;

a second bearing and a third bearing that supports the outer sleeve on the case in both sides of the gear;

a clutch device disposed between the first bearing and the third bearing in a direction of a common rotational axis of the outer sleeve and the inner sleeve and adapted to connect and interrupt a power transmission between the outer sleeve and the inner sleeve; and a ring shape actuator adapted to actuate the clutch device, wherein the power transmission between the outer sleeve and the inner sleeve is executed by passing a transmitting power through a radially internal space of the ring shape actuator from the clutch device, and wherein the case includes a detachable intermediate wall which supports the third bearing and the actuator.

6. A power transmission apparatus comprising:

a case;

an outer sleeve on which a gear is supported;

an inner sleeve which is concentrically disposed within the outer sleeve;

a first bearing that supports the inner sleeve;

a second bearing and a third bearing that supports the outer sleeve on the case in both sides of the gear;

a clutch device disposed between the first bearing and the third bearing in a direction of a common rotational axis of the outer sleeve and the inner sleeve and adapted to connect and interrupt a power transmission between the outer sleeve and the inner sleeve; and a ring shape actuator to generate a driving force for actuating the clutch device, wherein the power transmission between the outer sleeve and the inner sleeve is executed by passing a transmitting power through a radially internal space of the ring shape actuator from the clutch device, and wherein the clutch device is disposed between the first bearing and the ring shape actuator in the direction of the common rotational axis.

\* \* \* \* \*